United States Patent [19]

Day, III et al.

[11] 4,248,055
[45] Feb. 3, 1981

[54] HOT GAS BYPASS CONTROL FOR CENTRIFUGAL LIQUID CHILLERS

[75] Inventors: Arthur D. Day, III, Mechanicsburg; Harold B. Ginder, York, both of Pa.

[73] Assignee: Borg-Warner Corporation, Chicago, Ill.

[21] Appl. No.: 3,316

[22] Filed: Jan. 15, 1979

[51] Int. Cl.³ .................... F25B 41/00; F25D 17/02
[52] U.S. Cl. .................... 62/196 C; 62/209; 62/201
[58] Field of Search .................. 62/196 C, 208, 209, 62/201, 228 C

[56] References Cited

U.S. PATENT DOCUMENTS

| 2,739,451 | 3/1956 | Breck | 62/196 C X |
| 3,174,298 | 3/1965 | Kleiss | 62/211 |
| 3,250,084 | 5/1966 | Anderson | 62/208 X |
| 3,522,711 | 8/1970 | Shaughnessy | 62/196 |
| 3,780,532 | 12/1973 | Norbeck et al. | 62/201 |

*Primary Examiner*—William E. Wayner
*Assistant Examiner*—Harry Tanner
*Attorney, Agent, or Firm*—Robert L. Zieg

[57] ABSTRACT

A control system and a method are disclosed for automatically controlling a hot gas bypass valve as a function for cooling load and head. A valve/controller is provided for controlling the operation of the hot gas bypass valve so as to avoid surging of the compressor in response to temperatures of the chilled liquid entering the evaporator, the chilled liquid leaving the evaporator, and the liquid refrigerant at the outlet of the condenser.

10 Claims, 3 Drawing Figures

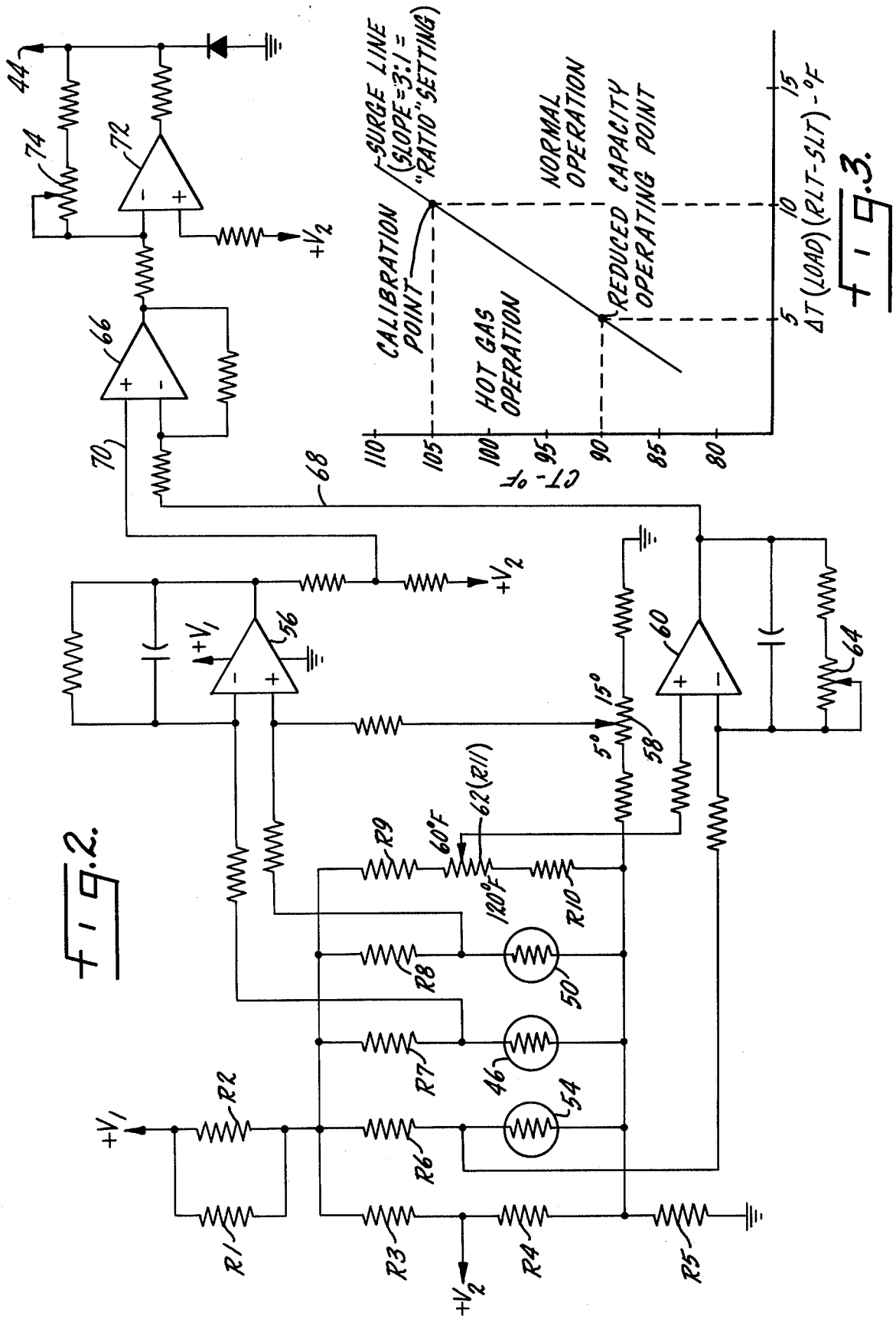

HOT GAS BYPASS CONTROL FOR CENTRIFUGAL LIQUID CHILLERS

BACKGROUND OF THE INVENTION

1. Field of the Invention:

This invention relates generally to refrigerating systems or chilling systems and more particularly, it relates to a control system for a hot gas bypass valve for centrifugal liquid chilling systems.

2. Description of the Prior Art:

In U.S. Pat. No. 3,174,298 issued to L. D. Kleiss on Mar. 23, 1965, there is described a control system for a water heating process wherein a first temperature transducer is connected to an outlet to provide a signal representative of the water temperature. This signal is compared with a set point which represents the desired water temperature at the outlet. A second temperature transducer is disposed in the inlet to provide a measurement of the water temperature at the inlet.

In U.S. Pat. No. 3,780,532 issued to D. K. Norbeck et al on Dec. 25, 1973 and assigned to the same assignee, there is described a control system for centrifugal compressors wherein the operation of pre-rotational vanes at the inlet to the compressor is controlled by measuring the temperature of the leaving chilled water.

In U.S. Pat. No. 3,522,711 issued to W. J. Shaughnessy on Aug. 4, 1970, there is disclosed a means for controlling a hot gas bypass valve of the solenoid type in a centrifugal chiller system by utilizing a signal representative of the position of the pre-rotation vanes to detect to a low-load condition and thus automatically opening the valve.

SUMMARY OF THE INVENTION

It is generally known that in order to avoid surging of the compressor in the operation of centrifugal liquid chilling systems during low-load or partial load conditions it is required to provide hot gas bypass flow. As the cooling load decreases, the requirement for hot gas bypass flow typically increases. The amount of hot gas bypass flow at a certain load condition is dependent upon the desired head pressure of the centrifugal compressor. For such chilling systems, the range of the change of chilled liquid temperature is proportional to the change of the cooling load. Further, the temperature of liquid refrigerant at the outlet of the condenser provides an indication of the head pressure. Thus, it would be desirable to provide a control system for the hot gas bypass flow as a function of the cooling load and head by sensing changes of the chilled liquid temperature range and the temperature of the liquid refrigerant in the condenser outlet.

In the present invention, there is provided an automatic control system for a hot gas bypass valve of a centrifugal liquid chiller as a function of cooling load and head by an electronic circuit incorporating three temperature sensing means adapted to measure the temperature of the supply chilled liquid line, the return chilled liquid line and the condenser drain line. The temperature sensing means on the supply and return lines are incorporated in individual resistance bridge circuits and are linearized to provide output signals to an operational amplifier. The output from the operational amplifier provides a signal representative of the difference in chilled liquid temperature across the evaporator and hence the cooling load. The temperature sensing means at the condenser outlet is incorporated into another bridge circuit whose output is compared to a set point by a second operational amplifier. The output of the second operational amplifier provides a signal that is proportional to the deviation of the condensing temperature from the set point and represents the compressor head. The load and head signals from their respective operational amplifiers are further combined by a third operational amplifier whose output signal is adapted to drive a hot gas bypass valve interface actuation means when such signal indicates an impending surge condition.

Accordingly, it is a general object of the present invention to provide a new and improved control system for a hot gas bypass valve so as to avoid surge conditions and yet maintain maximum efficiency.

It is another object of the present invention to provide an automatic control system for a hot gas bypass valve of a centrifugal liquid chiller as a function of cooling load and head.

It is still another object of the present invention to provide an automatic control system for a hot gas bypass valve having an electronic circuit incorporating three temperature sensing means adapted to measure the temperature of the supply chilled liquid line, the returned chilled liquid line and the condenser drain line.

BRIEF DESCRIPTION OF THE DRAWINGS

These and other objects of the present invention will become more fully apparent from the following detailed description when read in conjunction with the accompanying drawings wherein:

FIG. 2 is a detailed schematic diagram of the valve/controller for the hot gas bypass valve of the present invention; and FIG. 3 is a graph of an operating line at different chilled liquid temperatures for various differential temperature changes in the cooling load.

DETAILED DESCRIPTION OF THE PREFERRED EMBODIMENT

Figure 1:
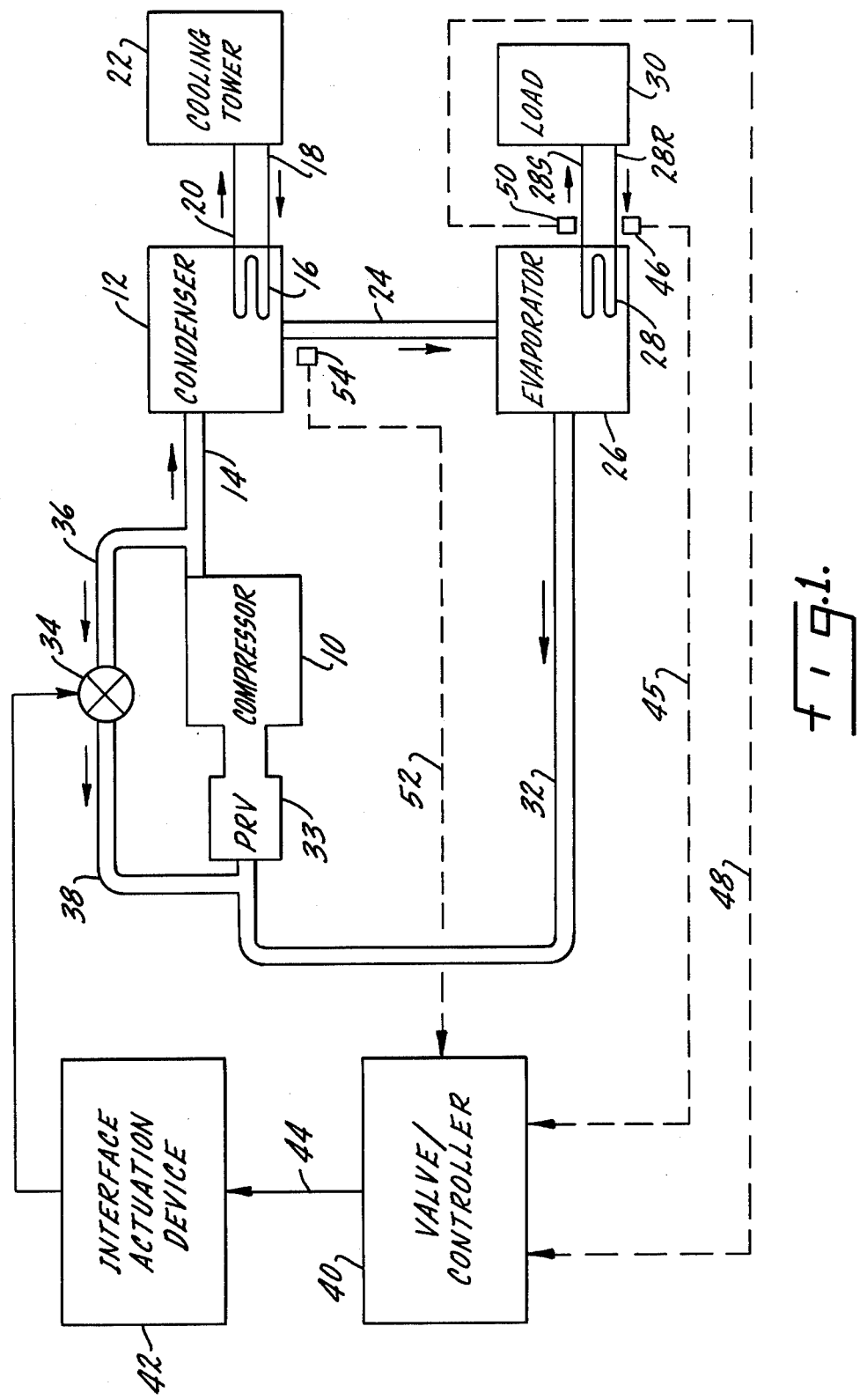
FIG. 1 is a schematic block diagram of a control system for a hot gas bypass valve in a centrifugal liquid chiller, according to the present invention.

Referring now in detail to the drawings, there is shown in block diagram form a control system for a hot gas bypass valve for a centrifugal liquid chiller in a refrigeration system. The refrigeration system includes a centrifugal compressor 10 which compresses the refrigerant vapor and delivers it to a condenser 12 via line 14. The condenser 12 is provided with a heat-exchanger coil 16 having inlet 18 and outlet 20 connected to a cooling tower 22. The condensed liquid refrigerant from the condenser 12 flows via line 24 to evaporator 26. The evaporator 26 is provided with a heat-exchanger coil 28 having a supply line 28S and a return line 28R connected to a cooling load 30. The vapor refrigerant in the evaporator 26 is returned to the compressor 10 via a suction line 32 containing prerotational vanes 33 (PRV). A hot gas bypass valve 34 is interconnected between lines 36 and 38 which are extended from the outlet of the compressor 10 to the inlet of the vanes 33. A valve/controller 40 drives an interface actuation device 42 for regulating progressively the opening and closing of the valve 34, which will be described more fully hereinafter. It will be appreciated that the conventional liquid chiller system includes many other features which are not shown in FIG. 1.

These features have been purposely omitted to simplify the drawing for ease of illustration.

The output of the valve/controller 40 on line 44 is a signal which is a function of the cooling load and head for automatically controlling the device 42 and thus the valve 34 so as to avoid an impending surge condition. The controller 40 receives a first input representative of the entering chilled liquid temperature through dotted line 45 by means of a temperature sensor 46 located on the return line 28R. A second input is sent through dotted line 48 by a temperature sensor 50 on the supply line 28S to detect the leaving chilled liquid temperature. A third input is transmitted to the controller 40 via line 52 by a temperature sensor 54 located on the line 24 which measures the temperature of the liquid refrigerant at the condenser outlet.

With reference to FIG. 2 of the drawings, there is shown a preferred embodiment of the valve/controller 40 in the present invention for automatically controlling the opening and closing of the hot gas bypass valve 34. It should be understood that while the controller 40 can be constructed in any number of other known ways such as mechanical, pneumatic and the like, the preferred controller utilizes solid-state electronic circuits employing thermistors as the aforementioned sensors.

An operational amplifier 56 receives an input signal on its inverting input from the thermistor 46 sensing the entering chilled liquid temperature to the heat-exchanger coil 28 of the evaporator 26. The amplifier 56 receives another input signal on its non-inverting input from the thermistor 50 sensing the leaving chilled liquid temperature from the heat-exchanger coil 28. A further input signal is applied to the non-inverting input by a potentiometer 58 defining a set point for the chilled liquid temperature range. The output of the amplifier 56 is a signal which is proportional to the difference in chilled liquid temperature across the evaporator 28 and represents a change in the cooling load.

A second operational amplifier 60 receives an input signal on its inverting input from the thermistor 54 sensing the temperature of the condensed liquid refrigerant at the condenser drain or outlet representative of compressor head. The amplifier 60 receives another input signal on its non-inverting input from a potentiometer 62 defining set point for the condensing temperature. The output of the amplifier 60 is a signal which is proportional to the deviation of the condensing temperature from the set point. The amplifier 60 is provided with a gain potentiometer 64 for adjusting its output signal with respect to the output signal from the amplifier 56.

A third operational amplifier 66 receives the signal representative of the compressor head on its inverting input from the amplifier 60 via line 68 and the signal representative of the change in the cooling load on its non-inverting input from the amplifier 56 via line 70. The amplifier 66 is formed as a unity gain subtractor whose output signal is delivered to a fourth operational amplifier 72 for modification. The amplifier 72 is provided with a gain potentiometer 74 for adjusting its output so as to provide an optimal amount of hot gas bypass flow for each chiller to which the control system is applied. The output signal from the amplifier 72 is on the line 44 which is applied to the interface actuation device 42 (FIG. 1) for controlling progressively the opening and closing of the bypass valve 34. The device 42 may consist of a conventional solid-state actuator drive circuit and actuator motor connected to the valve 34. The thermistors 46, 50 and 54 are connected in various individual resistance bridge type circuits which are linearized to provide a nearly constant volts per °F. output over the temperature ranges involves. The bridge type circuits consist of the thermistors 46, 50 and 54 and resistors R1 through R11. The various of values of resistance for these resistors are to be selected for the proper chilled liquid temperatures and the temperature of the liquid refrigerant in the condenser drain.

In order to better understand the operation of the control system for the bypass valve 34, an example will now be described. It is assumed that the refrigeration system has been running normally and the compressor 10 has now reached the point where it is just beginning to surge. The potentiometer 58 has been set to 10° and the potentiometer 62 has been set to 105° F. which determines the point at which the hot gas bypass valve starts to open. The potentiometer 64 is set to obtain a ratio of three for the deviation of the condensing temperature relative to the change in the cooling load. The potentiometer 74 is a sensitivity control which is set to adjust the amount of change required to completely open the valve from an initial closed position. Further, at this point the entering chilled liquid temperature is measured to be 55° F., the leaving chilled temperature is 45° F. and the condensing temperature is 105° F. From these settings and measurements, a surge line function curve is generated for different chilled liquid temperatures and various differential temperature changes in the cooling load and as shown in FIG. 3. Normal operation of the compressor will be achieved below and/or to the right of the "surge" line. Operating at a point above and/or to the left of the "surge" line will result in compressor surging and the operation of the hot gas bypass valve 34.

Assuming that the cooling load is reduced such that the entering chilled liquid temperature is 48° F. and the leaving chilled liquid temperature is 43° F. The difference in chilled liquid temperature is now 5° F. At the point of intersection with the surge line, a condensing temperature of 90° F. is indicated. If the actual condensing temperature in the refrigeration system is below 90° F., normal operation occurs. If the actual condensing temperature is above 90° F., the hot gas bypass valve is progressively open to eliminate surging.

From the foregoing description of the control system for a hot gas bypass valve embodying the present invention, it can be seen that there is provided a control system for controlling a bypass valve in response to the cooling load and head. The control system of the present invention allows for capacity reduction through a bypass valve so as to avoid compressor surging.

While there has been illustrated and described what is at present to be a preferred embodiment of the present invention, it will be understood by those skilled in the art that various changes and modifications may be made and equivalence may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention but that the invention will include all embodiments falling within the scope of the appended claims.

What is claimed is:

1. A control system for a hot gas bypass valve in a refrigeration system including a centrifugal compressor, a condenser, and an evaporator through which chilled liquid is circultated, said control system comprising:
   means for sensing the temperature of the chilled liquid entering the evaporator;
   means for sensing the temperature of the chilled liquid leaving the evaporator;
   means for sensing the temperature of the liquid refrigerant at the outlet of the condenser; and
   means responsive to the combination of the difference between the temperature of the chilled liquid entering the evaporator and the temperature of the chilled liquid leaving the evaporator with the temperature of the liquid refrigerant at the outlet of the condenser and adapted for automatically controlling the operation of a hot gas bypass valve so as to avoid surging of the compressor.

2. A control system as claimed in claim 1, wherein said controlling means comprises a valve/controller means and interface actuation means connected to said valve/controller means for opening the hot gas bypass valve.

3. A control system as claimed in claim 2, wherein said valve/controller means includes means for comparing the chilled liquid temperature entering the evaporator and the chilled liquid temperature leaving the evaporator to produce a signal representing the change of chilled liquid temperature range which is proportional to the change in cooling load.

4. A control system as claimed in claim 3, wherein said valve/controller means further includes means responsive to the liquid refrigerant temperature for generating a signal indicating compressor head.

5. A control system as claimed in claim 4, wherein said valve/controller means further includes means for combining the signal which is proportional to the change in cooling load and the signal indicating compressor head to provide a signal to initiate operation of said interface actuation means.

6. A control system as claimed in claim 5, wherein said interface actuation means includes an actuator drive circuit and actuator motor.

7. A method for controlling a hot gas bypass valve in a refrigeration system including a centrifugal compressor, condenser, and an evaporator through which chilled liquid is circulated, said method comprising the steps of:
   sensing the temperature of the chilled liquid entering the evaporator;
   sensing the temperature of the chilled liquid leaving the evaporator;
   sensing the temperature of liquid refrigerant at the outlet of the condenser; and
   controlling the operation of a hot gas bypass valve so as to avoid surging of the compressor in response to the temperatures of the chilled liquid entering the evaporator, the chilled liquid leaving the evaporator, and the liquid refrigerant at the outlet of the condenser.

8. A method as claimed in claim 7, wherein said controlling step includes the step of comparing the chilled liquid temperature entering the evaporator and the chilled liquid temperature leaving the evaporator to produce a signal representing the change of chilled liquid temperature range which is proportional to the change in cooling load.

9. A method as claimed in claim 8, wherein said controlling step further includes the step of generating a signal indicating compressor head in response to the liquid refrigerant temperature.

10. A method as claimed in claim 9, wherein said controlling step further includes the step of combining the signal which is proportional to the change in cooling load and the signal indicating compressor head to produce a signal to initiate operation of said hot gas bypass valve.

* * * * *

UNITED STATES PATENT AND TRADEMARK OFFICE
CERTIFICATE OF CORRECTION

PATENT NO. : 4,248,055
DATED : February 3, 1981
INVENTOR(S) : Arthur R. Day III et al It is certified that error appears in the above—identified patent and that said Letters Patent is hereby corrected as shown below:

On the title page, first inventor name should read

-- Arthur R. Day III --.

*Signed and Sealed this*

*Twenty-sixth* Day of *May 1981*

[SEAL]

Attest:

RENE D. TEGTMEYER

*Attesting Officer*     *Acting Commissioner of Patents and Trademarks*